(12) United States Patent
Morita et al.

(10) Patent No.: US 10,625,198 B2
(45) Date of Patent: Apr. 21, 2020

(54) DESULFURIZATION APPARATUS AND DESULFURIZATION METHOD

(71) Applicants: Panasonic Corporation, Kadoma-shi, Osaka (JP); Kyoto University, Kyoto-shi, Kyoto (JP)

(72) Inventors: Masashi Morita, Hyogo (JP); Jin Zhang, Osaka (JP); Hidenobu Wakita, Kyoto (JP); Yoichiro Tsuji, Osaka (JP); Susumu Kitagawa, Kyoto (JP); Masakazu Higuchi, Kyoto (JP)

(73) Assignees: PANASONIC CORPORATION, Osaka (JP); KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 16/387,210

(22) Filed: Apr. 17, 2019

(65) Prior Publication Data

US 2019/0240612 A1 Aug. 8, 2019

Related U.S. Application Data

(63) Continuation of application No. PCT/JP2017/045383, filed on Dec. 18, 2017.

(30) Foreign Application Priority Data

Jan. 26, 2017 (JP) .................................. 2017-012193

(51) Int. Cl.
*B01D 53/02* (2006.01)
*B01D 53/04* (2006.01)
(Continued)

(52) U.S. Cl.
CPC .............. *B01D 53/04* (2013.01); *B01J 20/02* (2013.01); *B01J 20/06* (2013.01); *B01J 20/18* (2013.01);
(Continued)

(58) Field of Classification Search
CPC ...... B01D 2253/102; B01D 2253/1124; B01D 2253/202; B01D 2256/24;
(Continued)

(56) References Cited

U.S. PATENT DOCUMENTS 9,252,443 B2 * 2/2016 Kani ....................... C01B 3/384
2008/0190289 A1 8/2008 Muller et al.
(Continued)

FOREIGN PATENT DOCUMENTS

CA 2110224 5/1994
EP 0599351 6/1994
(Continued)

OTHER PUBLICATIONS

Shigeo Satokawa et al., "Adsorptive removal of dimethylsulfide and t-butylmercaptan from pipeline natural gas fuel on Ag zeolites under ambient conditions", Applied Catalysis B: Environmental vol. 56, Issues 1-2, Mar. 10, 2005, pp. 51-56.
(Continued)

*Primary Examiner* — Christopher P Jones
(74) *Attorney, Agent, or Firm* — Hamre, Schumann, Mueller & Larson, P.C.

(57) ABSTRACT

A desulfurization apparatus according to the present invention includes: a first desulfurizer filled with a first desulfurization agent that removes a first sulfur compound from a hydrocarbon fuel; and a second desulfurizer filled with a second desulfurization agent that removes a second sulfur compound from the hydrocarbon fuel, the second desulfurizer being provided downstream of the first desulfurizer in a flow direction of the hydrocarbon fuel. The second desulfurization agent is constituted by a porous coordination polymer having a polymeric structure that is a combination of copper ions and organic ligands. A sulfur compound adsorption ability of the second desulfurization agent to (Continued)

adsorb the second sulfur compound is different from a sulfur compound adsorption ability of the first desulfurization agent to adsorb the first sulfur compound. A temperature of the second desulfurization agent is kept to 100° C. or lower. The desulfurization apparatus thus configured makes it possible to efficiently remove the sulfur compounds from the hydrocarbon fuel at low cost with a simple configuration.

8 Claims, 3 Drawing Sheets

(51) Int. Cl.
- *B01J 20/20* (2006.01)
- *B01J 20/18* (2006.01)
- *B01J 20/06* (2006.01)
- *B01J 20/22* (2006.01)
- *C10L 3/10* (2006.01)
- *B01J 20/02* (2006.01)

(52) U.S. Cl.
CPC ............... *B01J 20/20* (2013.01); *B01J 20/22* (2013.01); *B01J 20/226* (2013.01); *C10L 3/103* (2013.01); *B01D 2253/102* (2013.01); *B01D 2253/1124* (2013.01); *B01D 2253/202* (2013.01); *B01D 2256/24* (2013.01); *B01D 2257/306* (2013.01); *C10L 2290/541* (2013.01); *C10L 2290/542* (2013.01); *C10L 2290/548* (2013.01)

(58) Field of Classification Search
CPC .... B01D 2257/306; B01D 53/04; B01J 20/02; B01J 20/06; B01J 20/18; B01J 20/20; B01J 20/22; B01J 20/226; C10L 2290/541; C10L 3/10; C10L 3/103
See application file for complete search history.

(56) References Cited

U.S. PATENT DOCUMENTS

| | | |
|---|---|---|
| 2011/0138781 A1 | 6/2011 | Richter et al. |
| 2012/0085235 A1 | 4/2012 | De Weireld et al. |
| 2012/0208097 A1* | 8/2012 | Amano ............... C10G 25/00 429/410 |
| 2013/0309587 A1* | 11/2013 | Sugano ............... C10L 3/103 429/410 |

FOREIGN PATENT DOCUMENTS

| | | |
|---|---|---|
| JP | 3242514 | 10/2001 |
| JP | 2002-204953 | 7/2002 |
| JP | 2003-020489 | 1/2003 |
| JP | 2005-233230 | 9/2005 |
| JP | 2008-540110 | 11/2008 |
| JP | 2010-037480 | 2/2010 |
| JP | 2011-520592 | 7/2011 |
| JP | 2011-148662 | 8/2011 |
| JP | 2013-144284 | 7/2013 |
| JP | 2014-100655 | 6/2014 |

OTHER PUBLICATIONS

Hoang Phuoc Ho et al., "Deep desulfurization of fuel gas by adsorption on Cu-impregnated activated carbons in practical conditions", Korean Journal of Chemical Engineering, Jun. 2016, vol. 33, Issue 6, pp. 1908-1916.

International Search Report issued in International Application No. PCT/JP2017/045383, dated Jan. 23, 2018, 5 pages.

David Peralta et al: "Metal-Organic Framework Materials for Desulfurization by Adsorption," Energy & Fuels., vol. 26, No. 8, 2012, pp. 4953-4960.

The extended European Search Report issued for European Patent Application No. 17894267.8, dated Dec. 12, 2019, 7 pages.

\* cited by examiner

DESULFURIZATION APPARATUS AND DESULFURIZATION METHOD

CROSS-REFERENCE TO RELATED APPLICATION

The present application is a continuation application of International Application No. PCT/JP2017/045383, filed on Dec. 18, 2017, which claims priority to Japanese Patent Application No. 2017-012193, filed on Jan. 26, 2017. The contents of these applications are incorporated herein by reference in their entirety.

BACKGROUND OF THE INVENTION

1. Field of the Invention

The present invention relates to an apparatus for and a method of desulfurizing sulfur compounds contained in a hydrocarbon fuel.

2. Description of the Related Art

As one of hydrogen generation techniques for generating hydrogen from a hydrocarbon fuel such as natural gas or LPG, there is a known hydrogen generation apparatus that utilizes a steam reforming technique. Natural gas originally contains sulfur compounds, and in addition, generally speaking, other sulfur compounds such as tertiary-butylmercaptan (TBM), dimethyl sulfide (DMS), and tetrahydrothiophene (THT) in an amount of several ppm are added to the natural gas as odorants. The hydrogen generation apparatus includes a steam reforming catalyst, which tends to be poisoned by these sulfur compounds. For this reason, a desulfurization apparatus is provided upstream of the hydrogen generation apparatus.

As a desulfurization method using the desulfurization apparatus, for example, Japanese Patent No. 3242514 proposes a method in which hydrogen is added to city gas, and a copper-zinc based desulfurization agent prepared by a coprecipitation process is used to perform desulfurization. Japanese Laid-Open Patent Application Publication No. 2003-20489 proposes a desulfurization apparatus including a desulfurization container. The upstream side and the downstream side in the desulfurization container are filled with respective adsorbents that have different sulfur compound adsorption abilities from each other. "Adsorptive removal of dimethylsulfide and t-butylmercaptan from pipeline natural gas fuel on Ag zeolites under ambient conditions" (Shigeo Satokawa, Yuji Kobayashi, Hiroshi Fujiki, Applied Catalysis B: Environmental Volume 56, Issues 1-2, 10 Mar. 2005, Pages 51-56) also proposes to use, in adsorption desulfurization, a silver ion-exchange Y-type zeolite (AgNa—Y) as a material capable of effectively removing DMS, which is difficult to adsorb. "Deep desulfurization of fuel gas by adsorption on Cu-impregnated activated carbons in practical conditions" (Hoang Phuoc Ho, Palraj Kasinathan, Jaesung Kim, Doohwan Lee, Hee Chul Woo, Korean Journal of Chemical Engineering, June 2016, Volume 33, Issue 6, pp. 1908-1916) indicates that copper (Cu)-loaded activated carbon is also known for its strong adsorption with TBM. Japanese National Phase PCT Laid-Open Application Publication No. 2011-520592 and Japanese Laid-Open Patent Application Publication No. 2013-144284 also propose a desulfurization agent in which a porous coordination polymer is used.

SUMMARY OF THE INVENTION

An object of the present invention is, as one example, to provide a desulfurization apparatus and a desulfurization method that make it possible to efficiently remove sulfur compounds from a hydrocarbon fuel at low cost with a simple configuration.

A desulfurization apparatus according to one aspect of the present invention includes: a first desulfurizer filled with a first desulfurization agent that removes a first sulfur compound from a hydrocarbon fuel; and a second desulfurizer filled with a second desulfurization agent that removes a second sulfur compound from the hydrocarbon fuel, the second desulfurizer being provided downstream of the first desulfurizer in a flow direction of the hydrocarbon fuel. The second desulfurization agent is constituted by a porous coordination polymer having a polymeric structure that is a combination of copper ions and organic ligands. A sulfur compound adsorption ability of the second desulfurization agent to adsorb the second sulfur compound is different from a sulfur compound adsorption ability of the first desulfurization agent to adsorb the first sulfur compound. A temperature of the first desulfurization agent and a temperature of the second desulfurization agent are kept to 100° C. or lower.

A desulfurization method according to another aspect of the present invention is a desulfurization method using a desulfurization apparatus, the desulfurization apparatus including: a first desulfurizer filled with a first desulfurization agent that removes a first sulfur compound from a hydrocarbon fuel; and a second desulfurizer filled with a second desulfurization agent that removes a second sulfur compound from the hydrocarbon fuel, the second desulfurizer being provided downstream of the first desulfurizer in a flow direction of the hydrocarbon fuel, the second desulfurization agent being constituted by a porous coordination polymer having a polymeric structure that is a combination of copper ions and organic ligands. The desulfurization method includes: keeping a temperature of the first desulfurization agent and a temperature of the second desulfurization agent to 100° C. or lower; causing the hydrocarbon fuel to flow through the first desulfurizer and the second desulfurizer in this order; and removing the first and second sulfur compounds, which are different kinds of sulfur compounds, from the hydrocarbon fuel by adsorption in the first and second desulfurizers, respectively.

The desulfurization apparatus according to the one aspect and the desulfurization method according to the other aspect of the present invention have an advantage of being able to efficiently remove the sulfur compounds from the hydrocarbon fuel at low cost with a simple configuration.

The above and further objects, features, and advantages of the present invention will more fully be apparent from the following detailed description of a preferred embodiment with accompanying drawings.

DESCRIPTION OF THE PREFERRED EMBODIMENTS

Figure 1:
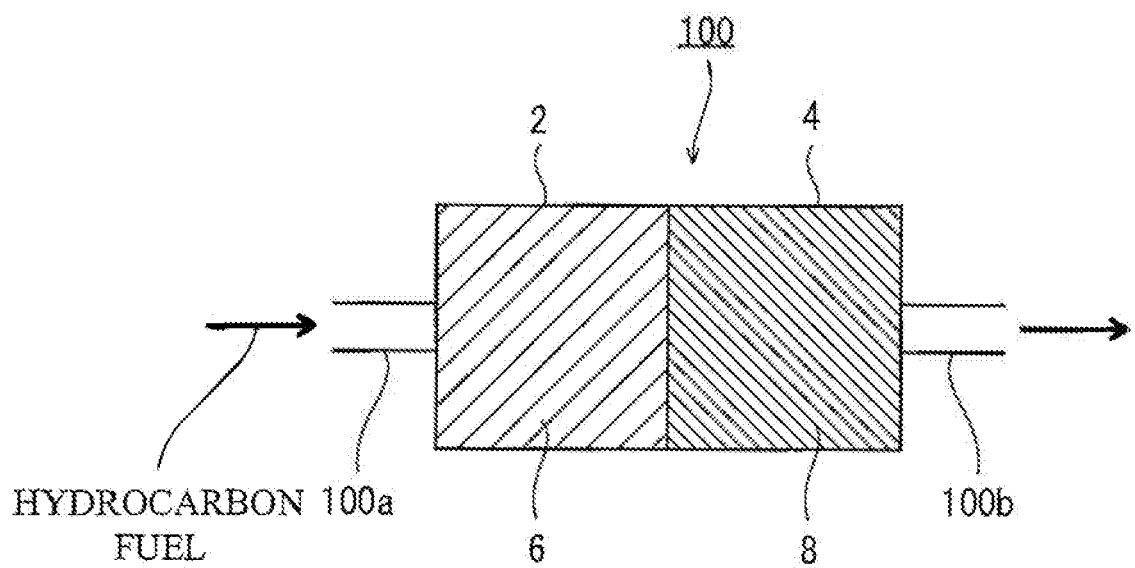
FIG. 1 shows one example of the configuration of a desulfurization apparatus according to one embodiment of the present invention.

Background Leading to One Embodiment of the Present Invention

In recent years, fuel cell co-generation systems with high power generation efficiency and high overall efficiency (hereinafter, simply referred to as "fuel cell systems") have been drawing attention as distributed power generators that make efficient energy utilization possible. Such a fuel cell system requires hydrogen when performing power generation. For this reason, in the fuel cell system, a hydrogen generation apparatus that generates hydrogen from a hydrocarbon fuel, such as natural gas or LPG, is installed together with a fuel cell. For example, the hydrogen generation apparatus generates hydrogen from the hydrocarbon fuel by using a steam reforming technique, which is one of the hydrogen generation techniques.

The hydrocarbon fuel originally contains sulfur compounds, and in addition, mercaptans such as TBM and sulfides such as DMS in an amount of several ppm are added to the hydrocarbon fuel as odorants. A steam reforming catalyst utilized in the aforementioned steam reforming technique tends to be poisoned by these sulfur compounds. For this reason, a desulfurization apparatus needs to be provided upstream of the steam reforming catalyst so as to desulfurize the hydrocarbon fuel.

There are three kinds of known desulfurization techniques that are "normal temperature desulfurization", "hydrodesulfurization", and "ultra-deep desulfurization". One example of the "normal temperature desulfurization" technique is an adsorption desulfurization technique, in which adsorption desulfurization is performed by a desulfurization apparatus at normal temperature and the desulfurization apparatus is replaced regularly. One example of the "hydrodesulfurization" technique is as follows: in a state where the temperature of a desulfurization apparatus is kept to 200 to 350° C., part of a reformed gas discharged from a hydrogen generation apparatus is returned to the desulfurization apparatus, and sulfur compounds are hydrogenated with hydrogen contained in the reformed gas by using, for example, a CoMo-based catalyst, thereby generating hydrogen sulfides; and the generated hydrogen sulfides are removed by using, for example, zinc oxide. One example of the "ultra-deep desulfurization" technique is as follows: in a manner similar to the desulfurization apparatus disclosed in Japanese Patent No. 3242514, sulfur compounds are hydrogenated with hydrogen at 200 to 350° C. by using a CuZnO-based desulfurization agent, and concurrently, the sulfur compounds are removed by absorption.

In the adsorption desulfurization technique, the sulfur compounds are removed by adsorption at normal temperature by using a zeolite that contains a transition metal such as Ag, Cu, or Mn. However, depending on the kind of the transition metal, the adsorption ability of the zeolite may be hindered by water contained in the gas. In this respect, "Adsorptive removal of dimethylsulfide and t-butylmercaptan from pipeline natural gas fuel on Ag zeolites under ambient conditions" indicates that the use of a Ag-zeolite is effective, because Ag-zeolites are less susceptible to a gas dew point and capable of removing DMS, which is difficult to adsorb.

However, Ag-zeolites are expensive and the use thereof is costly. In this respect, Japanese Laid-Open Patent Application Publication No. 2003-20489 proposes a desulfurization apparatus in which desulfurization agents having different sulfur compound adsorption abilities from each other are arranged in two stages so as to reduce the Ag-zeolite filling amount. In the desulfurization apparatus according to Japanese Laid-Open Patent Application Publication No. 2003-20489, mercaptans are removed by the desulfurization agent provided at the upstream stage, and DMS is removed by the desulfurization agent provided at the downstream stage. In the desulfurization apparatus according to Japanese Laid-Open Patent Application Publication No. 2003-20489, a sulfur compound adsorbent, such as activated carbon, a manganese dioxide, or a zeolite, is used as the desulfurization agent provided at the upstream stage, and a sulfur compound adsorbent that is a zeolite supporting a transition metal, such as Ag, is used as the desulfurization agent provided at the downstream stage. It should be noted that, for example, copper-loaded activated carbon disclosed in "Deep desulfurization of fuel gas by adsorption on Cu-impregnated activated carbons in practical conditions" can also be used as the desulfurization agent provided at the upstream stage so as to remove mercaptans at low cost.

It has been found that it is effective to use a metal-organic framework (MOF), which has a porous coordination network structure, as a desulfurization agent. For example, Japanese National Phase PCT Laid-Open Application Publication No. 2011-520592 reports a desulfurization agent in which MIL-101, which is one kind of porous coordination polymer (PCP) made of Cr ions and benzene-1,4-dicarboxylic acid, is used. Japanese Laid-Open Patent Application Publication No. 2013-144284 describes a porous coordination polymer that supports a Ag-based catalyst. It is reported that the porous coordination polymer exhibits higher hydrogen sulfide removal ability than Ag-zeolites.

The inventors of the present invention conducted studies on the desulfurization apparatuses disclosed in the aforementioned literatures, i.e., Japanese Patent No. 3242514, Japanese Laid-Open Patent Application Publication No. 2003-20489, Japanese National Phase PCT Laid-Open Application Publication No. 2011-520592, Japanese Laid-Open Patent Application Publication No. 2013-144284, "Adsorptive removal of dimethylsulfide and t-butylmercaptan from pipeline natural gas fuel on Ag zeolites under ambient conditions", and "Deep desulfurization of fuel gas by adsorption on Cu-impregnated activated carbons in practical conditions". As a result of the studies, they have found the following problems. Specifically, in the case of the desulfurization apparatus disclosed in Japanese Patent No. 3242514, in order to add hydrogen to the city gas, it is necessary to adopt a configuration that allows part of a reformed gas generated by a hydrogen generation apparatus to return to the desulfurization apparatus. In addition, the temperature of the desulfurization agent needs to be kept to 200 to 350° C. For these reasons, the desulfurization apparatus disclosed in Japanese Patent No. 3242514 has a problem that the configuration thereof is complex.

In the case of using a PCP that supports a Ag-based catalyst, or using a Ag-zeolite, as a desulfurization agent as in Japanese Laid-Open Patent Application Publication No. 2013-144284 and "Adsorptive removal of dimethylsulfide and t-butylmercaptan from pipeline natural gas fuel on Ag zeolites under ambient conditions", there is a problem of high cost due to the use of Ag.

In the desulfurization apparatus disclosed in Japanese Laid-Open Patent Application Publication No. 2003-20489 or "Deep desulfurization of fuel gas by adsorption on Cu-impregnated activated carbons in practical conditions", if activated carbon is used at the upstream stage for the purpose of removing mercaptans such as TBM, and a Ag-zeolite is used at the downstream stage for the purpose of removing sulfides such as DMS, there still is a cost problem due to the use of Ag. The inventors of the present invention have also noticed that, in the case of using a Ag-zeolite as the desulfurization agent provided at the downstream stage for the purpose of removing sulfides, DMS removal ability is lower than in the case of using a porous coordination polymer as the desulfurization agent. Further, in the desulfurization apparatus according to Japanese National Phase PCT Laid-Open Application Publication No. 2011-520592, for example, MIL-101 used as the desulfurization agent not only requires pressurization, but also has insufficient sulfur compound removal ability.

In view of the above, the inventors of the present invention conducted studies to come up with a desulfurization apparatus that makes it possible to efficiently remove sulfur compounds, particularly DMS which is difficult to desulfurize, from a hydrocarbon fuel at low cost with a simple configuration. In the studies, the inventors focused on a porous coordination polymer (PCP)/metal-organic framework (MOF), which is made of inorganic and organic components and has a high specific surface area based on its uniform skeleton structure, and in which metal ions exist at the atomic level. As the metal ions of the PCP, the inventors selected copper ions effective for desulfurization, and as a result, found specific DMS removal ability superior to that of the conventional art, thus arriving at the present invention. Specifically, the present invention provides various aspects as described below.

A desulfurization apparatus according to a first aspect of the present invention includes: a first desulfurizer filled with a first desulfurization agent that removes a first sulfur compound from a hydrocarbon fuel; and a second desulfurizer filled with a second desulfurization agent that removes a second sulfur compound from the hydrocarbon fuel, the second desulfurizer being provided downstream of the first desulfurizer in a flow direction of the hydrocarbon fuel. The second desulfurization agent is constituted by a porous coordination polymer having a polymeric structure that is a combination of copper ions and organic ligands. A sulfur compound adsorption ability of the second desulfurization agent to adsorb the second sulfur compound is different from a sulfur compound adsorption ability of the first desulfurization agent to adsorb the first sulfur compound. A temperature of the second desulfurization agent is kept to 100° C. or lower.

According to the above configuration, since the first desulfurization agent and the second desulfurization agent have different sulfur compound adsorption abilities from each other, even if the hydrocarbon fuel contains a plurality of kinds of sulfur compounds, such different kinds of sulfur compounds can be separately removed from the hydrocarbon fuel by adsorption by means of the first and second desulfurization agents, respectively. In particular, the second desulfurization agent is constituted by the porous coordination polymer having a polymeric structure that is a combination of copper ions and organic ligands. Therefore, among sulfur compounds, sulfides such as dimethyl sulfide can be desulfurized by the second desulfurizer without using, for example, Ag, which is expensive.

Moreover, the temperature of the second desulfurization agent is kept to 100° C. or lower, i.e., kept to room temperature or kept within the internal temperature range of a system in which the desulfurization apparatus is installed. Accordingly, a configuration for applying heat to the second desulfurization agent from the outside of the system to keep the second desulfurization agent at high temperature is unnecessary, and thus the configuration of the desulfurization apparatus can be simplified. Since the temperature of the second desulfurization agent is kept to 100° C. or lower, desorption of adsorbed molecules from the second desulfurization agent can be prevented.

Therefore, the desulfurization apparatus according to the first aspect of the present invention has an advantage of being able to efficiently remove the sulfur compounds from the hydrocarbon fuel at low cost with a simple configuration.

A desulfurization apparatus according to a second aspect of the present invention may be configured such that, in the above first aspect, the porous coordination polymer includes coordinatively unsaturated open-metal sites.

The above configuration allows the metal ions in a coordination state to include vacant sites. Accordingly, sulfur compound molecules that are not adsorbed by the pores of the porous structure of the porous coordination polymer can be adsorbed by the vacant sites.

The desulfurization apparatus configured as above realizes improvement in the desulfurization performance for removing the sulfur compounds from the hydrocarbon fuel.

A desulfurization apparatus according to a third aspect of the present invention may be configured such that, in the above first or second aspect, each of the organic ligands includes at least one carboxylate group and at least one benzene ring.

A desulfurization apparatus according to a fourth aspect of the present invention may be configured such that, in any one of the above first to third aspects, each of the organic ligands is 1,3,5-benzenetricarboxylic acid or a derivative thereof.

A desulfurization apparatus according to a fifth aspect of the present invention may be configured such that, in any one of the above first to fourth aspects, the first desulfurization agent is activated carbon or a transition metal oxide.

According to the above configuration, since the first desulfurization agent is activated carbon or a transition metal oxide, among sulfur compounds, mercaptans can be removed by adsorption by means of the first desulfurization agent. Thus, in the desulfurization apparatus, mercaptans can be removed from the hydrocarbon fuel by the first desulfurizer, and sulfides such as dimethyl sulfide can be removed from the hydrocarbon fuel by the second desulfurizer.

A desulfurization apparatus according to a sixth aspect of the present invention may be configured such that, in the above fifth aspect, a ratio of a filling weight of the first desulfurization agent to a filling weight of the second desulfurization agent is within a range of 4:1 to 7:1.

According to the above configuration, the ratio of the filling weight of the first desulfurization agent to the filling weight of the second desulfurization agent is set within the range of 4:1 to 7:1. With such setting, the proportion the filling weight of the first desulfurization agent and the proportion of the filling weight of the second desulfurization agent can be adjusted to necessary and sufficient proportions for removing sulfur compounds from the hydrocarbon fuel.

A desulfurization apparatus according to a seventh aspect of the present invention may be configured such that, the desulfurization apparatus according to any one of the above first to sixth aspects further includes a third desulfurizer filled with a third desulfurization agent that removes a third sulfur compound from the hydrocarbon fuel, the third desulfurizer being provided downstream of the second desulfurizer in the flow direction of the hydrocarbon fuel. The third desulfurization agent contains a nickel ion- or silver ion-exchange zeolite. A sulfur compound adsorption ability of the third desulfurization agent to adsorb the third sulfur compound is different from the sulfur compound adsorption ability of the first desulfurization agent and the sulfur compound adsorption ability of the second desulfurization agent. A temperature of the third desulfurization agent is kept to 100° C. or lower.

According to the above configuration, since the desulfurization apparatus further includes the third desulfurizer, sulfur compounds that cannot be removed by the first desulfurizer and the second desulfurizer can be removed by the third desulfurizer. Thus, the desulfurization apparatus according to the above configuration realizes further improvement in the desulfurization performance.

A desulfurization apparatus according to an eighth aspect of the present invention may be configured such that, in the above seventh aspect, a filling amount of the second desulfurization agent filling the second desulfurizer is greater than a filling amount of the third desulfurization agent filling the third desulfurizer.

A desulfurization apparatus according to a ninth aspect of the present invention may be configured such that, in any one of the above first to eighth aspects, the hydrocarbon fuel contains dimethyl sulfide and mercaptans as the sulfur compounds.

A desulfurization method according to a tenth aspect of the present invention is a desulfurization method using a desulfurization apparatus, the desulfurization apparatus including: a first desulfurizer filled with a first desulfurization agent that removes a first sulfur compound from a hydrocarbon fuel; and a second desulfurizer filled with a second desulfurization agent that removes a second sulfur compound from the hydrocarbon fuel, the second desulfurizer being provided downstream of the first desulfurizer in a flow direction of the hydrocarbon fuel, the second desulfurization agent being constituted by a porous coordination polymer having a polymeric structure that is a combination of copper ions and organic ligands. The desulfurization method includes: keeping a temperature of the second desulfurization agent to 100° C. or lower; causing the hydrocarbon fuel to flow through the first desulfurizer and the second desulfurizer in this order; and removing the first and second sulfur compounds, which are different kinds of sulfur compounds, from the hydrocarbon fuel by adsorption in the first and second desulfurizers, respectively.

According to the above method, since different kinds of sulfur compounds are removed from the hydrocarbon fuel by adsorption in the first and second desulfurizers, respectively, even if the hydrocarbon fuel contains a plurality of kinds of sulfur compounds, such different kinds of sulfur compounds can be separately removed from the hydrocarbon fuel by adsorption by means of the first and second desulfurization agents, respectively. In particular, the second desulfurization agent is constituted by the porous coordination polymer having a polymeric structure that is a combination of copper ions and organic ligands. Therefore, among sulfur compounds, sulfides such as dimethyl sulfide can be desulfurized by the second desulfurizer without using, for example, Ag, which is expensive.

According to the above method, the temperature of the second desulfurization agent is kept to 100° C. or lower, i.e., kept to room temperature or kept within the internal temperature range of a system in which the desulfurization apparatus is installed. Accordingly, a configuration for applying heat to the second desulfurization agent from the outside of the system to keep the second desulfurization agent at high temperature is unnecessary, and thus the configuration of the desulfurization apparatus can be simplified. Since the temperature of the second desulfurization agent is kept to 100° C. or lower, desorption of adsorbed molecules from the second desulfurization agent can be prevented.

Therefore, the desulfurization method according to the tenth aspect of the present invention has an advantage of being able to efficiently remove the sulfur compounds from the hydrocarbon fuel at low cost by the desulfurization apparatus with a simple configuration.

Hereinafter, specific examples of one embodiment of the present invention are described with reference to the drawings.

(Configuration of Desulfurization Apparatus)

First, the configuration of a desulfurization apparatus 100 according to the embodiment is described with reference to FIG. 1. FIG. 1 shows one example of the configuration of the desulfurization apparatus 100 according to the embodiment of the present invention. The desulfurization apparatus 100 is an apparatus for removing sulfur compounds from a hydrocarbon fuel that is supplied to, for example, a hydrogen generation apparatus. Examples of the hydrocarbon fuel include city gas, natural gas, ethane, propane, and LPG (liquefied petroleum gas). Examples of the sulfur compounds contained in the hydrocarbon fuel include mercaptans such as TBM and sulfides such as DMS.

As shown in FIG. 1, the desulfurization apparatus 100 includes a first desulfurizer 2 and a second desulfurizer 4. The sulfur compound adsorption ability of the second desulfurizer 4 is different from that of the first desulfurizer 2. In the desulfurization apparatus 100, the second desulfurizer 4 is provided downstream of the first desulfurizer 2 in the flow direction of the hydrocarbon fuel. The hydrocarbon fuel is supplied from an inlet-side passage 100a to the internal space of the desulfurization apparatus 100; the hydrocarbon fuel flows through the first desulfurizer 2 and the second desulfurizer 4 in this order; and the hydrocarbon fuel that has been desulfurized is discharged from the internal space of the desulfurization apparatus 100 to the outside through an outlet-side passage 100b.

The first desulfurizer 2 is filled with a first desulfurization agent 6, which removes mercaptans from the hydrocarbon fuel by adsorption. Examples of the first desulfurization agent 6 include activated carbon and a transition metal oxide. The activated carbon is, for example, copper-loaded activated carbon. The mercaptan adsorption capacity of the copper-loaded activated carbon is about 3 wt %. As previously described, the use of copper-loaded activated carbon as a desulfurization agent at normal temperature is known. Therefore, the detailed description thereof is omitted herein. The transition metal oxide is, for example, a manganese dioxide.

The second desulfurizer 4 is filled with a second desulfurization agent 8, which removes DMS from the hydrocarbon fuel by adsorption. The second desulfurization agent 8 is constituted by a porous coordination polymer having a polymeric structure that is a combination of copper ions and organic ligands. The second desulfurization agent 8 may be a PCP that includes copper ions as its metal ions and in which each of the organic ligands includes at least one carboxylate group and at least one benzene ring, such as 1,3,5-benzenetricarboxylic acid, 2-hydroxy-1,4-benzenedicarboxylic acid, biphenyl-3,4',5-tricarboxylic acid, biphenyl-3,3',5,5'-tetracarboxylic acid, terphenyl-3,3",5,5"-tetracarboxylic acid, or 1,3,5-tris(4-carboxyphenyl)benzene. Alternatively, each of the organic ligands may be 1,3,5-benzenetricarboxylic acid or a derivative thereof.

As previously described, Japanese National Phase PCT Laid-Open Application Publication No. 2011-520592 discloses the use of, for example, MIL-101 as a desulfurization agent at normal temperature, the MIL-101 being one kind of PCP made of Cr ions and benzene-1,4-dicarboxylic acid. However, in the case of using MIL-101 as a desulfurization agent, the desulfurization agent not only requires pressurization, but also has low sulfur compound removal ability (adsorption ability). In this respect, the inventors of the present invention have found that the sulfur compound removal ability of the PCP depends on what ions are selected as metal ions to be contained in the PCP. Then, the inventors have discovered that, by selecting copper ions as metal ions effective for desulfurization and to be contained in the PCP, DMS removal ability under normal pressure can be improved. Based on these findings, in the desulfurization apparatus 100 according to the embodiment of the present invention, copper ions less expensive than silver ions are selected as the metal ions of the PCP, which constitutes the second desulfurization agent 8.

Figure 2:
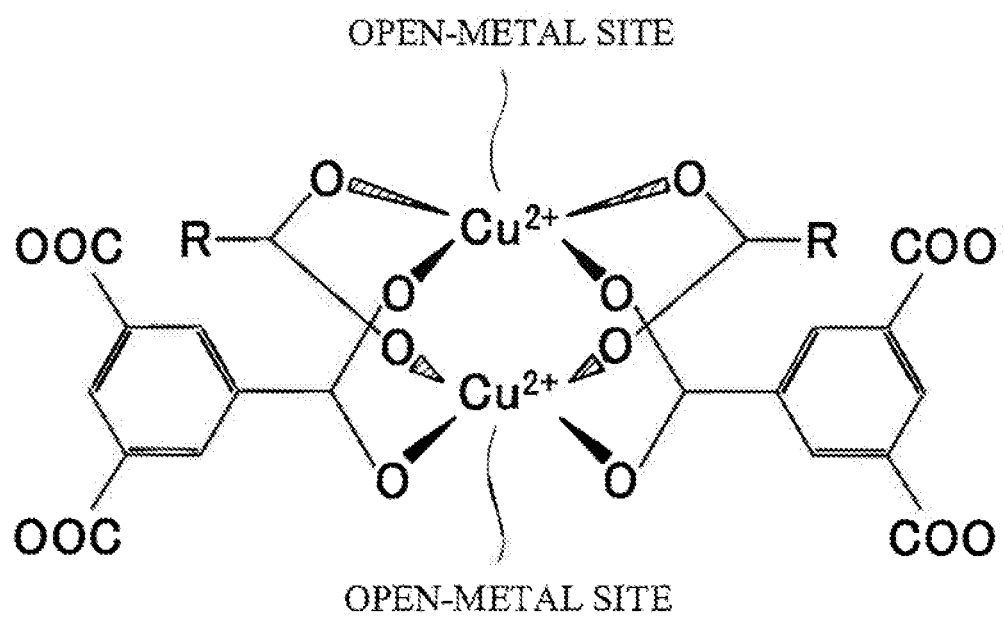
FIG. 2 shows one example of open-metal sites in a porous coordination polymer constituting a desulfurization agent of a second desulfurizer included in the desulfurization apparatus shown in FIG. 1.

The porous coordination polymer constituting the second desulfurization agent 8 may include open-metal sites as shown in FIG. 2. FIG. 2 shows one example of the open-metal sites in the porous coordination polymer constituting the second desulfurization agent 8 of the second desulfurizer 4 included in the desulfurization apparatus 100 shown in FIG. 1. In one mode of the open-metal sites, as shown in FIG. 2, the metal ions are coordinatively unsaturated and each metal ion in a coordination state includes at least one vacant site, i.e., the open-metal sites are coordinatively unsaturated sites. In this case, the vacant sites can act as sites capable of adsorbing sulfur compound molecules that are not adsorbed by the pores of the porous structure of the second desulfurization agent 8. In another mode of the open-metal sites, the metal ions are coordinatively saturated, but the ligands are twisted and distorted relative to each other. In this case, sites where the ligands are twisted and distorted relative to each other are vacant sites, and these sites adsorb molecules that are not adsorbed by the pores of the porous structure of the second desulfurization agent 8.

In the desulfurization apparatus 100, the temperature of the first desulfurization agent 6 and the temperature of the second desulfurization agent 8 are kept to 100° C. or lower. The reason for this is as follows: if the temperature of the second desulfurization agent 8 becomes higher than 100° C., desorption of the adsorbed molecules occurs dominantly; then at a temperature of 300° C. or higher, structure destruction of the second desulfurization agent 8 occurs due to oxidative decomposition of the organic ligands; and consequently, desulfurization performance cannot be kept. A configuration for heating the second desulfurization agent 8 is unnecessary, and the second desulfurization agent 8 can be suitably used without being heated or cooled from the outside of the system. For example, in a case where the second desulfurization agent 8 is incorporated in a system such as a fuel cell system, it is preferable that the second desulfurization agent 8 be used within the internal temperature range of the system (not lower than −10° C. and not higher than 100° C.).

It should be noted that the ratio of the filling weight of the first desulfurization agent 6 to the filling weight of the second desulfurization agent 8 in the desulfurization apparatus 100 can be set within the range of 4:1 to 7:1. Such setting has been arrived at based on the relationship between the amount of mercaptan adsorption by the first desulfurization agent 6 and the amount of DMS adsorption by the second desulfurization agent 8 in consideration of the composition of various hydrocarbon fuels that are usable as the fuel of, for example, a hydrogen generation apparatus. By setting the ratio of the filling weight of the first desulfurization agent 6 to the filling weight of the second desulfurization agent 8 within the range of 4:1 to 7:1, the proportion the filling weight of the first desulfurization agent 6 and the proportion of the filling weight of the second desulfurization agent 8 can be adjusted to necessary and sufficient proportions for removing sulfur compounds from the hydrocarbon fuel.

(Desulfurization Method)

Figure 3:
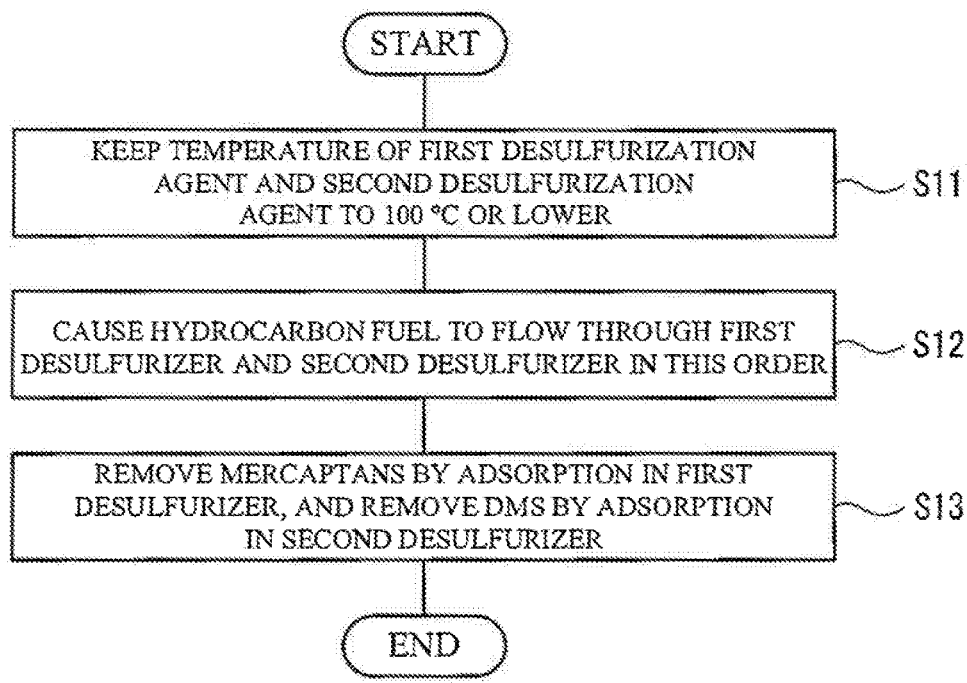
FIG. 3 is a flowchart showing one example of a method of desulfurizing a hydrocarbon fuel by using the desulfurization apparatus shown in FIG. 1.

Next, a method of desulfurizing a hydrocarbon fuel by using the desulfurization apparatus 100 is described with reference to FIG. 3. FIG. 3 is a flowchart showing one example of the method of desulfurizing a hydrocarbon fuel by using the desulfurization apparatus 100 shown in FIG. 1.

Specifically, in the desulfurization apparatus 100 configured as above, first, the temperature of the first desulfurization agent 6 filling the first desulfurizer 2 and the temperature of the second desulfurization agent 8 filling the second desulfurizer 4 are kept to 100° C. or lower (step S11). Then, the hydrocarbon fuel is supplied from the inlet-side passage 100*a* to the internal space of the desulfurization apparatus 100 to cause the hydrocarbon fuel to flow through the first desulfurizer 2 and the second desulfurizer 4 in this order (step S12). When the hydrocarbon fuel flows through these desulfurizers, different kinds of sulfur compounds are removed from the hydrocarbon fuel by adsorption in the first and second desulfurizers 2 and 4, respectively. Specifically, mercaptans are removed by adsorption in the first desulfurizer 2, and DMS is removed by adsorption in the second desulfurizer 4 (step S13). The hydrocarbon fuel, the sulfur compounds in which have been desulfurized by the first desulfurizer 2 and the second desulfurizer 4, is discharged from the internal space of the desulfurization apparatus 100 to the outside through the outlet-side passage 100*b*. In this manner, the sulfur compounds can be removed from the hydrocarbon fuel in the desulfurization apparatus 100, and then the hydrocarbon fuel can be supplied to, for example, a hydrogen generation apparatus.

(Variations)

Figure 4:
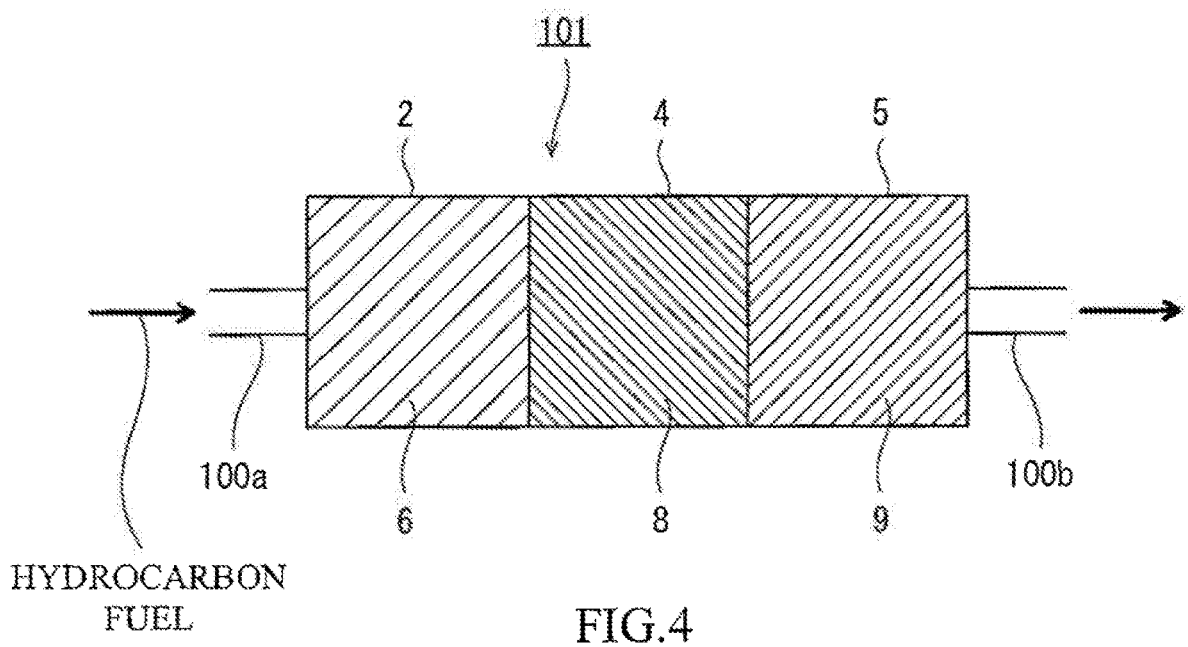
FIG. 4 shows one example of the configuration of a desulfurization apparatus according to one variation of the embodiment of the present invention.

The desulfurization apparatus 100 according to the above-described embodiment includes the first desulfurizer 2 and the second desulfurizer 4. However, as shown in FIG. 4, a desulfurization apparatus 101 according to one variation of the embodiment is configured such that the above-described desulfurization apparatus 100 further includes a third desulfurizer 5 provided downstream of the second desulfurizer 4 in the flow direction of the hydrocarbon fuel, the third desulfurizer 5 being operative to remove sulfur compounds from the hydrocarbon fuel. FIG. 4 shows one example of the configuration of the desulfurization apparatus 101 according to the variation of the embodiment of the present invention. In the desulfurization apparatus 101 according to the variation, the hydrocarbon fuel is supplied from the inlet-side passage 100a to the internal space of the desulfurization apparatus 101, and flows through the first desulfurizer 2, the second desulfurizer 4, and the third desulfurizer 5 in this order. Then, the hydrocarbon fuel that has been desulfurized is discharged from the desulfurization apparatus 101 to the outside through the outlet-side passage 100b.

A third desulfurization agent 9 filling the third desulfurizer 5 contains a nickel ion- or Ag ion-exchange zeolite, and the sulfur compound adsorption ability of the third desulfurization agent 9 is different from that of the first desulfurization agent 6 and that of the second desulfurization agent 8. Similar to the first desulfurization agent 6 and the second desulfurization agent 8, the temperature of the third desulfurization agent 9 is kept to 100° C. or lower.

As described above, since the desulfurization apparatus 101 further includes the third desulfurizer 5, sulfur compounds that cannot be removed by the first desulfurizer 2 and the second desulfurizer 4 can be removed by the third desulfurizer 5. Thus, the desulfurization apparatus 101 according to the variation realizes further improvement in the desulfurization performance.

It should be noted that, in the desulfurization apparatus 101 according to the variation, the filling weight of the second desulfurization agent 8 is greater than the filling weight of the third desulfurization agent 9. For this reason, even if a Ag ion-exchange zeolite is used as the third desulfurization agent 9 in the desulfurization apparatus 101, compared to a configuration where the Ag ion-exchange zeolite is the only desulfurization agent used therein, a necessary amount of Ag for obtaining the same desulfurization performance can be reduced. Also compared to a desulfurization apparatus that is formed by arranging desulfurizers in two stages such that the desulfurization agent of the desulfurizer at the downstream stage (second stage) is a Ag ion-exchange zeolite, a necessary amount of Ag for obtaining the same desulfurization performance can be reduced in the desulfurization apparatus 101. Thus, the desulfurization apparatus 101 makes it possible to reduce the usage amount of Ag, thereby realizing cost reduction.

Described next is an example case where the PCP used as the second desulfurization agent 8, which is a characteristic component of the present invention, is HKUST-1 ($Cu_3(BTC)_2$; BTC=1,3,5-benzenetricarboxylic acid). In Examples indicated below, a method of producing the second desulfurization agent 8 and a desulfurization test performed on the second desulfurization agent 8 are described.

(Method of Producing Second Desulfurization Agent)

First, as the second desulfurization agent 8, HKUST-1 made of copper ions and benzene-1,3,5-tricarboxylic acid was prepared by microwave heating.

Figure 5:
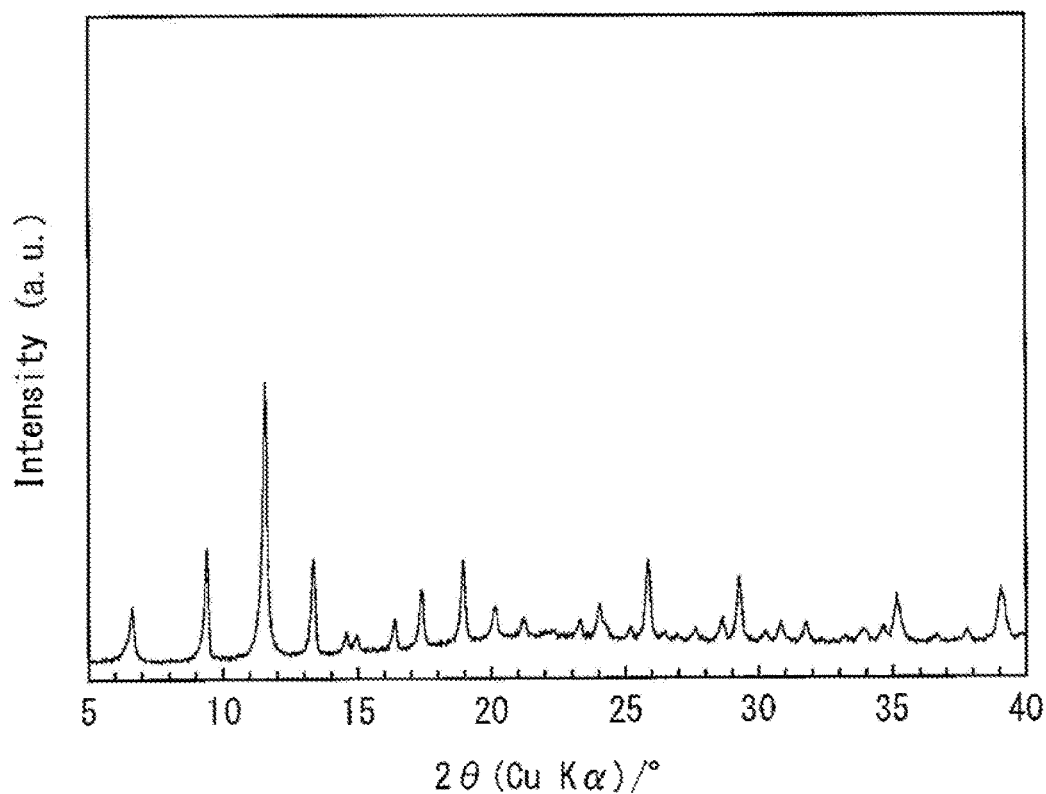
FIG. 5 shows one example of an X-ray diffraction pattern of HKUST-1 before a desulfurization test was performed thereon.

Specifically, 704 mg of copper(II) nitrate trihydrate available from NACALAI TESQUE, INC. was mixed with 336 mg of 1,3,5-benzenetricarboxylic acid available from Tokyo Chemical Industry Co., Ltd., 9.6 mL of ethanol available from Wako Pure Chemical Industries, Ltd. and 9.6 mL of distilled water to prepare a raw material solution. The raw material solution thus prepared was heated by a microwave synthesizer at 140° C. for one hour. The resulting sample was subjected to solid-liquid separation, and then washed by ethanol three times and subjected to drying under reduced pressure. Thereafter, the sample was heat-treated under vacuum at 120° C. for 4 hours. Subsequently, the residual solvent and the like were removed from the sample. The resulting sample was subjected to X-ray diffraction measurement. Through the measurement, an X-ray diffraction pattern shown in FIG. 5 was observed. FIG. 5 shows one example of the X-ray diffraction pattern of HKUST-1 before a desulfurization test was performed thereon. It should be noted that, in FIG. 5, the vertical axis represents diffraction intensity, and the horizontal axis represents diffraction angle (2θ). It can be confirmed from the diffraction pattern shown in FIG. 5 that HKUST-1 was produced.

(Desulfurization Test Performed on Second Desulfurization Agent)

Next, a desulfurization test was performed to evaluate the desulfurization performance of the second desulfurization agent (HKUST-1) produced in the above-described manner. First, a fixed bed flow reactor with a reaction tube having an internal diameter of 7 mm was filled with 1.1 g of HKUST-1 as the second desulfurization agent 8. The HKUST-1 filling the fixed bed flow reactor had a mass median diameter of 20 μm. Next, city gas (13A) containing dimethyl sulfide (DMS) in a concentration of 100 vol ppm was caused to flow through the reaction tube at a linear speed of 100 cm/min. During the test, the temperature of the second desulfurization agent 8 was kept to 30° C. A minute sulfur content analyzer of an oxidative decomposition/ultraviolet fluorescence type was used to check the sulfur concentration in the city gas discharged from the reaction tube. A gas chromatograph mounted with a sulfur chemiluminescence detector (GC-SCD) was used to analyze the city gas discharged from the reaction tube, and thereby the sulfur compounds were identified. In the measurement, a time elapsed from a point when the test was started to a point when the sulfur concentration in the discharged city gas reached 100 vol ppb was defined as a breakthrough time. The sulfur compound adsorption capacity was calculated based on the total amount of sulfur that had flowed until the elapse of the breakthrough time in relation to the weight of the second desulfurization agent 8 filling the fixed bed flow reactor.

Figure 6:
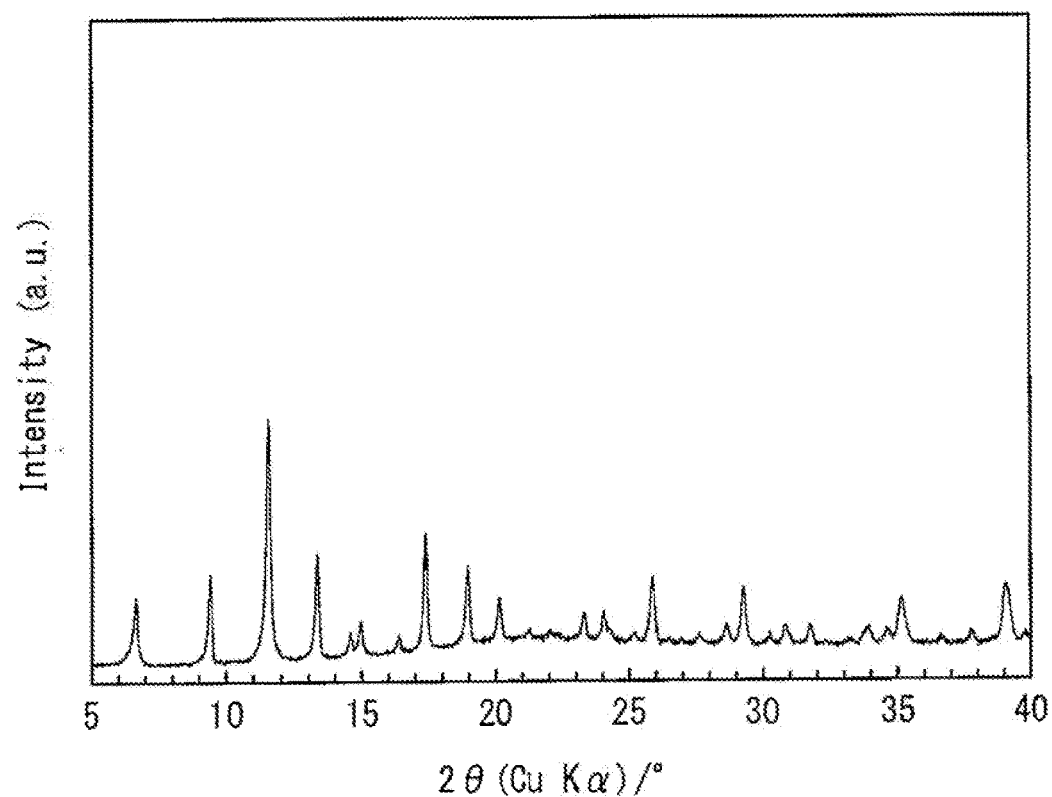
FIG. 6 shows one example of the X-ray diffraction pattern of HKUST-1 after the desulfurization test was performed thereon.

As a result, in the case of using HKUST-1 as the second desulfurization agent 8, as indicated by Sample 1 of Table 1, the adsorption capacity was 12 wt %. After the desulfurization test was performed on the second desulfurization agent 8, the X-ray diffraction pattern of the second desulfurization agent 8 was checked. The check result exhibited that the X-ray diffraction pattern shown in FIG. 6, i.e., the X-ray diffraction pattern of the second desulfurization agent 8 after the desulfurization test was performed thereon, was almost the same as the X-ray diffraction pattern shown in FIG. 5, i.e., the X-ray diffraction pattern of the second desulfurization agent 8 before the desulfurization test was performed thereon. FIG. 6 shows one example of the X-ray diffraction pattern of HKUST-1 after the desulfurization test was performed thereon.

That is, it was found that the second desulfurization agent 8 after the desulfurization test was performed thereon exhibited almost no changes, in terms of structure and strength, from the second desulfurization agent 8 before the desulfurization test was performed thereon. This suggests that the second desulfurization agent 8 is capable of adsorbing DMS without being structurally destroyed.

For the comparison purposes, the same desulfurization test was performed by using MIL-53 (available from BASF) made of aluminum ions and terephthalic acid. As a result, as indicated by Sample 2 of Table 1, the adsorption capacity was 0 wt %. It is understood from this result that the use of copper ions as the metal ions of the PCP is more effective for DMS adsorption than the use of aluminum ions as the metal ions of the PCT.

The same desulfurization test was additionally performed in the case of using a Ag-zeolite as the desulfurization agent. As a result, as indicated by Sample 3 of Table 1, the adsorption capacity was 3 wt %. It is understood from this result that better DMS adsorption ability is obtained in the case of using, as the desulfurization agent, a PCP that includes copper ions as its metal ions and in which each of the organic ligands include at least one carboxylate group and at least one benzene ring than in the case of using a Ag-zeolite as the desulfurization agent.

TABLE 1

|  | Desulfurizer | Fuel gas | Kind and concentration of sulfur compound | Linear speed (cm/min) | Temperature (° C.) | Breakthrough time (hours) | Adsorption capacity in relation to weight of desulfurization agent (wt %) |
|---|---|---|---|---|---|---|---|
| Sample 1 | HKUST-1 | 13A | DMS | 100 | 30 | 400 | 12 |
| Sample 2 | MIL-53 | (City | (100 ppm) |  |  | 0 | 0 |
| Sample 3 | Ag zeolite | gas) |  |  |  | 100 | 3 |

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

The desulfurization apparatus according to the present invention is applicable to, for example, a fuel cell system in which it is necessary to remove sulfur compounds by adsorption from a sulfur-compound-containing hydrocarbon fuel.

What is claimed is:

1. A desulfurization apparatus comprising:
a first desulfurizer filled with a first desulfurization agent that removes a first sulfur compound from a hydrocarbon fuel; and
a second desulfurizer filled with a second desulfurization agent that removes a second sulfur compound from the hydrocarbon fuel, the second desulfurizer being provided downstream of the first desulfurizer in a flow direction of the hydrocarbon fuel, wherein
the first desulfurization agent is activated carbon or a transition metal oxide,
the second desulfurization agent is constituted by a porous coordination polymer having a polymeric structure that is a combination of copper ions and organic ligands,
a sulfur compound adsorption ability of the second desulfurization agent to adsorb the second sulfur compound is different from a sulfur compound adsorption ability of the first desulfurization agent to adsorb the first sulfur compound, and
a temperature of the second desulfurization agent is kept to 100° C. or lower.

2. The desulfurization apparatus according to claim 1, wherein
the porous coordination polymer includes coordinatively unsaturated open-metal sites.

3. The desulfurization apparatus according to claim 1, wherein
each of the organic ligands includes at least one carboxylate group and at least one benzene ring.

4. The desulfurization apparatus according to claim 1, wherein
each of the organic ligands is 1,3,5-benzenetricarboxylic acid or a derivative thereof.

5. The desulfurization apparatus according to claim 1, wherein
a ratio of a filling weight of the first desulfurization agent to a filling weight of the second desulfurization agent is within a range of 4:1 to 7:1.

6. The desulfurization apparatus according to claim 1, further comprising a third desulfurizer filled with a third desulfurization agent that removes a third sulfur compound from the hydrocarbon fuel, the third desulfurizer being provided downstream of the second desulfurizer in the flow direction of the hydrocarbon fuel, wherein
the third desulfurization agent contains a nickel ion- or silver ion-exchange zeolite,
a sulfur compound adsorption ability of the third desulfurization agent to adsorb the third sulfur compound is different from the sulfur compound adsorption ability of the first desulfurization agent and the sulfur compound adsorption ability of the second desulfurization agent, and
a temperature of the third desulfurization agent is kept to 100° C. or lower.

7. The desulfurization apparatus according to claim 6, wherein
a filling amount of the second desulfurization agent filling the second desulfurizer is greater than a filling amount of the third desulfurization agent filling the third desulfurizer.

8. The desulfurization apparatus according to claim 4, wherein the desulfurization apparatus is configured so that, in use,
the second desulfurizer removes dimethyl sulfide and the first desulfurizer removes mercaptans.

* * * * *